United States Patent
Antoku et al.

(10) Patent No.: US 8,213,117 B2
(45) Date of Patent: Jul. 3, 2012

(54) MAGNETIC HEAD WITH PROTECTIVE LAYER AND A PROTECTIVE FILM REMOVAL METHOD FOR THE MAGNETIC HEAD

(75) Inventors: Yosuke Antoku, Tokyo (JP); Norio Takahashi, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/794,148

(22) Filed: Jun. 4, 2010

(65) Prior Publication Data

US 2011/0299187 A1 Dec. 8, 2011

(51) Int. Cl.
*G11B 5/127* (2006.01)

(52) U.S. Cl. .......... 360/125.31; 360/125.72; 360/125.74

(58) Field of Classification Search ............. 360/125.31, 360/125.74, 234.4, 125.72, 125.73, 125.3
See application file for complete search history.

(56) References Cited

U.S. PATENT DOCUMENTS

| | | | |
|---|---|---|---|
| 5,302,434 A * | 4/1994 | Doerner et al. ............... 428/831 |
| 5,673,156 A * | 9/1997 | Chen et al. .................. 360/97.01 |
| 5,959,801 A * | 9/1999 | Gillis et al. ..................... 360/75 |
| 5,991,113 A * | 11/1999 | Meyer et al. ..................... 360/75 |
| 6,493,183 B1 * | 12/2002 | Kasiraj et al. ............ 360/125.44 |
| 6,557,241 B1 | 5/2003 | Sasaki |
| 6,775,103 B2 * | 8/2004 | Kang et al. ................. 360/236.5 |
| 6,920,020 B2 * | 7/2005 | Yamanaka et al. ............ 360/317 |
| 6,963,464 B2 * | 11/2005 | Xu et al. .......................... 360/75 |
| 6,992,865 B2 * | 1/2006 | Thurn et al. ............... 360/294.7 |
| 7,286,326 B2 * | 10/2007 | Yasui et al. ................. 360/235.2 |
| 7,324,299 B1 * | 1/2008 | Schreck et al. .................. 360/75 |
| 7,352,524 B2 * | 4/2008 | Kiyono et al. ................... 360/75 |
| 7,400,473 B1 * | 7/2008 | Krajnovich et al. ....... 360/294.7 |
| 7,558,022 B2 * | 7/2009 | Kurita et al. ............... 360/234.4 |
| 7,589,928 B2 | 9/2009 | Roy et al. |
| 7,859,794 B2 * | 12/2010 | Tani et al. .................. 360/235.7 |
| 7,974,046 B2 * | 7/2011 | Ota et al. .................... 360/294.7 |
| 2003/0011932 A1 * | 1/2003 | Mei et al. .................... 360/234.3 |
| 2003/0174430 A1 * | 9/2003 | Takahashi et al. .............. 360/75 |
| 2004/0201920 A1 * | 10/2004 | Koide et al. .................... 360/128 |
| 2004/0218302 A1 * | 11/2004 | Maat ................................ 360/59 |
| 2005/0024775 A1 * | 2/2005 | Kurita et al. ............... 360/234.3 |
| 2005/0117242 A1 * | 6/2005 | Taguchi .......................... 360/59 |

(Continued)

FOREIGN PATENT DOCUMENTS

JP 4-366408 12/1992

(Continued)

*Primary Examiner* — Brian Miller
(74) *Attorney, Agent, or Firm* — Oblon, Spivak, McClelland, Maier & Neustadt, L.L.P.

(57) ABSTRACT

A magnetic head includes a reproducing element for reproducing information recorded on a magnetic recording medium, a recording element for recording information on the magnetic recording medium, and a heating resistor. The magnetic head has a magnetic medium-facing surface on which the reproducing element and the recording element are exposed.
The magnetic head is obtained as follows:
(1) a protective film is formed to cover the magnetic medium-facing surface;
(2) within a case of a magnetic recording/reproducing apparatus including the magnetic recording medium, the magnetic medium-facing surface is opposed to a surface of the magnetic recording medium;
(3) the heating resistor is allowed to generate heat by power supply while rotating the magnetic recording medium, wherein thermal expansion due to the heat generation causes bulging of the magnetic medium-facing surface, bringing the protective film into contact with the magnetic recording medium; and
(4) a portion of the protective film covering at least one of the reproducing element and the recording element is removed by scraping.

20 Claims, 13 Drawing Sheets

U.S. PATENT DOCUMENTS

| | | |
|---|---|---|
| 2006/0023339 A1 | 2/2006 | Fukuyama et al. |
| 2006/0034013 A1* | 2/2006 | Kato et al. ................... 360/128 |
| 2006/0072246 A1* | 4/2006 | Fujimaki et al. ........... 360/235.1 |
| 2006/0103981 A1* | 5/2006 | Kiyono et al. ................ 360/126 |
| 2007/0188919 A1* | 8/2007 | Kobayashi .................... 360/126 |
| 2008/0007871 A1 | 1/2008 | Kiyono et al. |
| 2008/0019041 A1* | 1/2008 | Aoki ............................ 360/110 |
| 2008/0094755 A1 | 4/2008 | Ota et al. |

FOREIGN PATENT DOCUMENTS

| | | |
|---|---|---|
| JP | 2000-251222 | 9/2000 |
| JP | 2007-328880 | 12/2007 |
| JP | 2008-16158 | 1/2008 |
| JP | 2008-123654 | 5/2008 |
| JP | 4358700 | 8/2009 |

* cited by examiner

MAGNETIC HEAD WITH PROTECTIVE LAYER AND A PROTECTIVE FILM REMOVAL METHOD FOR THE MAGNETIC HEAD

BACKGROUND OF THE INVENTION

1. Field of the Invention

The present invention relates to a magnetic head, a head assembly, a magnetic recording/reproducing apparatus, and a manufacturing method therefor.

2. Description of the Related Art

In the field of magnetic recording/reproducing apparatuses such as hard disk drive (HDD), a number of magnetic disks being a recording medium are installed in order to meet the demand for improved recording density. The increase in number of the magnetic disks not only causes vibration and noise problem of the magnetic disk due to air turbulence, so-called windage, but also increases fluid loss occurring during rotation of the magnetic disk, so-called windage loss, which results in the necessity of increasing the power of a motor to be built in the apparatus.

In order to solve this problem, for example, Japanese Unexamined Patent Application Publication No. 2007-328880 discloses a technology in which in order to reduce the windage and windage loss, an air within an apparatus is replaced by a helium gas of a lower gas density and then the apparatus is completely sealed as a whole.

On the other hand, Japanese Patent Publication No. 004358700 discloses a technology in which in the process of recording given servo data in a servo region of a magnetic disk indicating a track address, an air within an apparatus is temporarily replaced by an inert gas of a low gas density such as helium, thereby reducing the windage and improving writing accuracy of the servo data.

According to the former technology, the helium gas is finally kept sealed within the apparatus, while according to the latter technology, since the inert gas is again replaced by an air after writing of the servo data, the air is finally sealed within the apparatus. If it is possible to achieve high airtightness so as not to let the gas leak out of the apparatus, it is apparent that the former technology is preferable in view of the technical effects, because the windage can be reduced even in a usual information reproducing and recording process, making it possible to improve reading and writing accuracy. Moreover, since undesirable chemical reaction can be prevented by sealing the inert gas into the apparatus, it is also possible to prevent corrosion of the magnetic head and the magnetic disk.

However, since the apparatus manufactured by the former technology has a case structure with high airtightness, there is a problem that a protective film of DLC (diamond-like carbon) formed on a magnetic medium-facing surface of a built-in magnetic head cannot be removed from the outside after assembly. This protective film, which is provided so as to protect the magnetic head from corrosive action due to a surfactant during a plurality of cleaning processes in a series of production processes, is substantially essential to the production processes.

However, if the inert gas is sealed within the apparatus using the above technology, the corrosive action after assembly of the apparatus can be sufficiently prevented, and as a result, the protective film becomes unnecessary. Because of its thickness, moreover, the protective film increases the magnetical distance between the surface of the magnetic disk and the magnetic medium-facing surface of the magnetic head, which may become an obstacle to performance improvement in recording and reproducing of information.

SUMMARY OF THE INVENTION

It is an object of the present invention to provide a magnetic head, a head assembly, and a magnetic recording/reproducing apparatus capable of achieving performance improvement in recording and/or reproducing of information, and a manufacturing method therefor.

1. Magnetic Head

In order to solve the above problem, a magnetic head according to the present invention comprises a reproducing element for reproducing information recorded on a magnetic recording medium, a recording element for recording information on the magnetic recording medium, and a heating resistor, the magnetic head having a magnetic medium-facing surface on which the reproducing element and the recording element are exposed.

Moreover, the magnetic head according to the present invention is obtained from the following processes.
(1) A protective film is formed to cover the magnetic medium-facing surface.
(2) Within a case of a magnetic recording/reproducing apparatus including the magnetic recording medium, the magnetic medium-facing surface is opposed to a surface of the magnetic recording medium.
(3) The heating resistor is allowed to generate heat by power supply while rotating the magnetic recording medium, wherein thermal expansion due to the heat generation causes bulging of the magnetic medium-facing surface, bringing the protective film into contact with the magnetic recording medium.
(4) A portion of the protective film covering at least one of the reproducing element and the recording element is removed by scraping.

Since the protective film is formed on the magnetic medium-facing surface at the above process (1), the magnetic head according to the present invention will never be corroded at the cleaning processes in the above production process.

Moreover, after the magnetic head according to the present invention is assembled in the magnetic recording/reproducing apparatus at the above process (2), the protective film can be pressed against the surface of the rotating magnetic recording medium at the above process (3). Then, the reproducing element and/or the recording element can be exposed to the atmosphere within the apparatus at the above process (4).

When the magnetic head according to the present invention performs recording or reproducing of information, accordingly, the reproducing element and/or the recording element can be bulged by the heat generation of the heating resistive element, bringing the reproducing element and/or the recording element closer to the magnetic recording medium by a removed thickness of the protective film.

Thus, the magnetic head according to the present invention can achieve performance improvement in recording and/or reproducing of information by reducing the magnetical distance between the magnetic medium-facing surface and the magnetic recording medium.

2. Head Assembly

In order to solve the above problem, a head assembly according to the present invention comprises the above magnetic head and a head support device.

The head support device supports the magnetic head in such a manner as to permit rolling and pitching of the magnetic head.

In the present invention, examples of the head assembly include an HGA (head gimbal assembly) in which the magnetic head is mounted on a head support device (gimbal) and an HAA (head arm assembly) in which the HGA is mounted on an arm.

Since the head assembly according to the present invention includes the above magnetic head, it also exhibits the effects thus far described.

3. Magnetic Recording/Reproducing Apparatus

In order to solve the above problem, a magnetic recording/reproducing apparatus according to the present invention comprises a head assembly including a magnetic head, a magnetic recording medium, and a motor for rotating the magnetic recording medium all disposed within an inert gas-sealed case.

The magnetic head includes a heating resistor and has a magnetic medium-facing surface covered with a protective film.

The heating resistor generates heat by power supply, wherein thermal expansion due to the heat generation causes bulging of the magnetic medium-facing surface, bringing the protective film into contact with the magnetic recording medium.

A typical example of the magnetic recording/reproducing apparatus is a hard disk drive (HDD) using a magnetic recording medium called "hard disk".

In the magnetic recording/reproducing apparatus according to the present invention, since the inert gas is sealed into the case, it is possible to reduce the above windage and windage loss. In addition, since the protective film is formed on the magnetic medium-facing surface, the magnetic head will never be corroded at the cleaning processes in the above production process.

Moreover, the heating resistor generates heat by power supply, wherein thermal expansion due to the heat generation causes bulging of the magnetic medium-facing surface, bringing the protective film into contact with the magnetic recording medium.

In the magnetic recording/reproducing apparatus according to the present invention, therefore, the protective film can be brought into contact with the surface of the magnetic recording medium, wherein the protective film can be removed by scraping with the magnetic recording medium being rotated by the motor.

Thus, since the reproducing element and/or the recording element on the magnetic medium-facing surface can be exposed to the atmosphere within the apparatus, the magnetic recording/reproducing apparatus according to the present invention can exhibit the same effects as the above magnetic head.

4. Magnetic Recording/Reproducing Apparatus Manufacturing Method

In order to solve the above problem, a method for manufacturing a magnetic recording/reproducing apparatus according to the present invention comprises the steps of:
(1) forming a protective film on a magnetic medium-facing surface of a magnetic head including a heating resistor;
(2) assembling a head assembly by attaching the magnetic head to a head support device;
(3) attaching the head assembly and a magnetic recording medium within a case;
(4) sealing an inert gas into the case; and
(5) supplying the heating resistor with power to generate heat while rotating the magnetic recording medium, wherein thermal expansion due to the heat generation causes bulging of the magnetic medium-facing surface, bringing the protective film into contact with the magnetic recording medium.

Since the magnetic recording/reproducing apparatus equipped with the above magnetic head can be obtained according to the magnetic recording/reproducing apparatus manufacturing method according to the present invention, there can be obtained the effects thus far described.

The other objects, constructions and advantages of the present invention will be further detailed below with reference to the attached drawings. However, the attached drawings show only illustrative examples.

DESCRIPTION OF THE PREFERRED EMBODIMENTS

Figure 1:
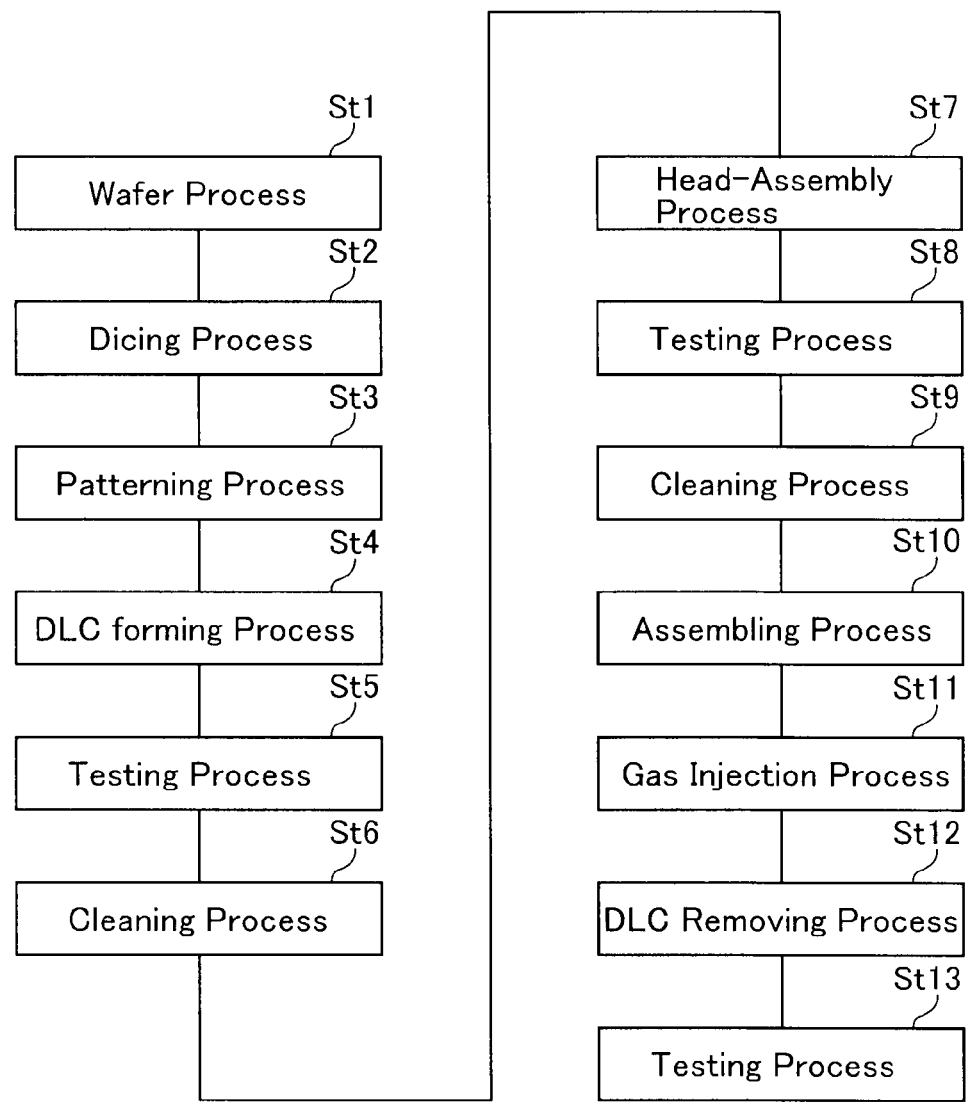
FIG. 1 is a flow chart schematically showing a production process of a magnetic recording/reproducing apparatus according to the present invention.

FIG. 1 is a flow chart schematically showing a production process of a magnetic recording/reproducing apparatus according to the present invention. With reference to the flow chart, a magnetic head, a head assembly, a magnetic recording/reproducing apparatus, and a manufacturing method therefor according to the present invention will be described below.

First of all, a wafer process (St1) to a cleaning process (St6) are main production processes of a magnetic head according to the present invention. A wafer for the magnetic head, which has been produced at the wafer process (St1) using a known technology, is divided into blocks at a dicing process (St2) and further divided stepwise to obtain a rod-like raw bar in which a given number of magnetic heads are arranged side-by-side. At this stage, reproducing and recording elements of the magnetic head are exposed on a magnetic medium-facing surface.

At a patterning process (St3), then, an air bearing surface (ABS), i.e., the magnetic medium-facing surface, is formed by a known etching process using a mask obtained by a photolithography process.

The magnetic medium-facing surface is then covered with a protective film made of diamond-like carbon (DLC) at a DLC forming process (St4). The protective film is formed using a known process such as plasma CVD. It should be noted that although DLC is taken as a typical example in the present embodiment, the protective film is not limited thereto and there may be employed other materials capable of preventing corrosive action.

At a testing process (St5), then, the raw bar is divided into individual magnetic heads, and each magnetic head is subjected to property test and appearance check. After the test, the magnetic head is cleaned at the cleaning process (St6) so as to remove a stain which has adhered to a terminal during the test. At this time, since the magnetic medium-facing surface is covered with the protective film, it is sufficiently protected from the corrosive action due to a surfactant.

Figure 2:
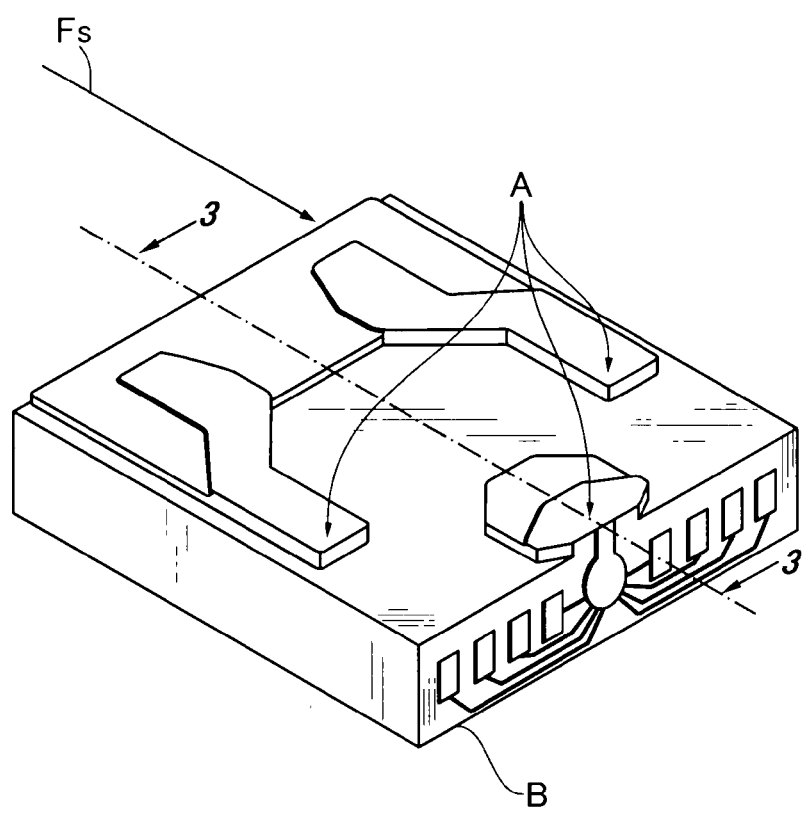
FIG. 2 is a perspective view of a magnetic head.

FIG. 2 shows an exemplary appearance of a magnetic head thus obtained. The magnetic head has a slider substrate B of a generally rectangular prism structure and an air bearing surface A directly relating to floating characteristics. The air bearing surface A is configured to generate a pressure for floating the magnetic head utilizing viscosity of fluid flow Fs generated by rotation of the magnetic disk.

Figure 3:
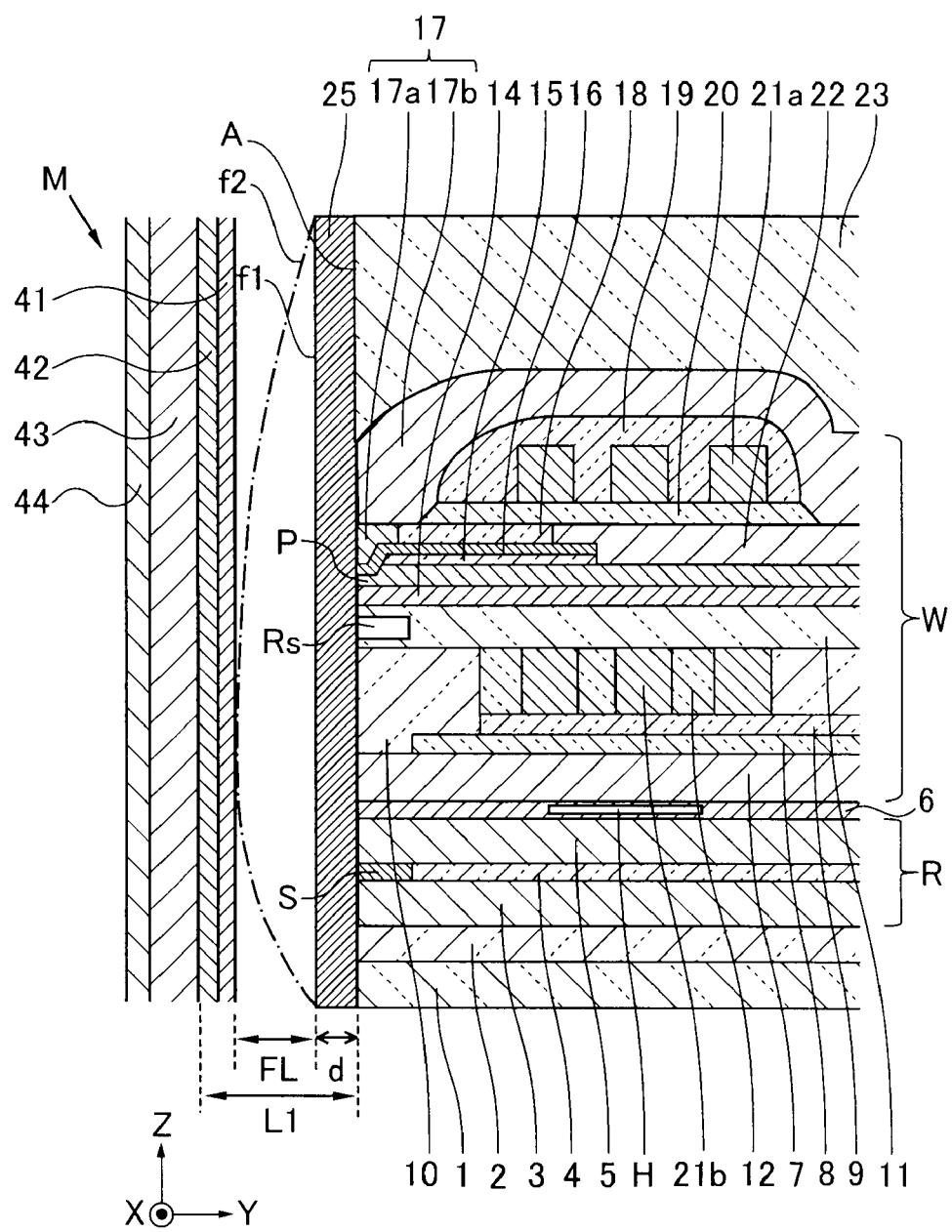
FIG. 3 is a partial sectional view taken along line 3-3 in FIG. 2.
Figure 4:
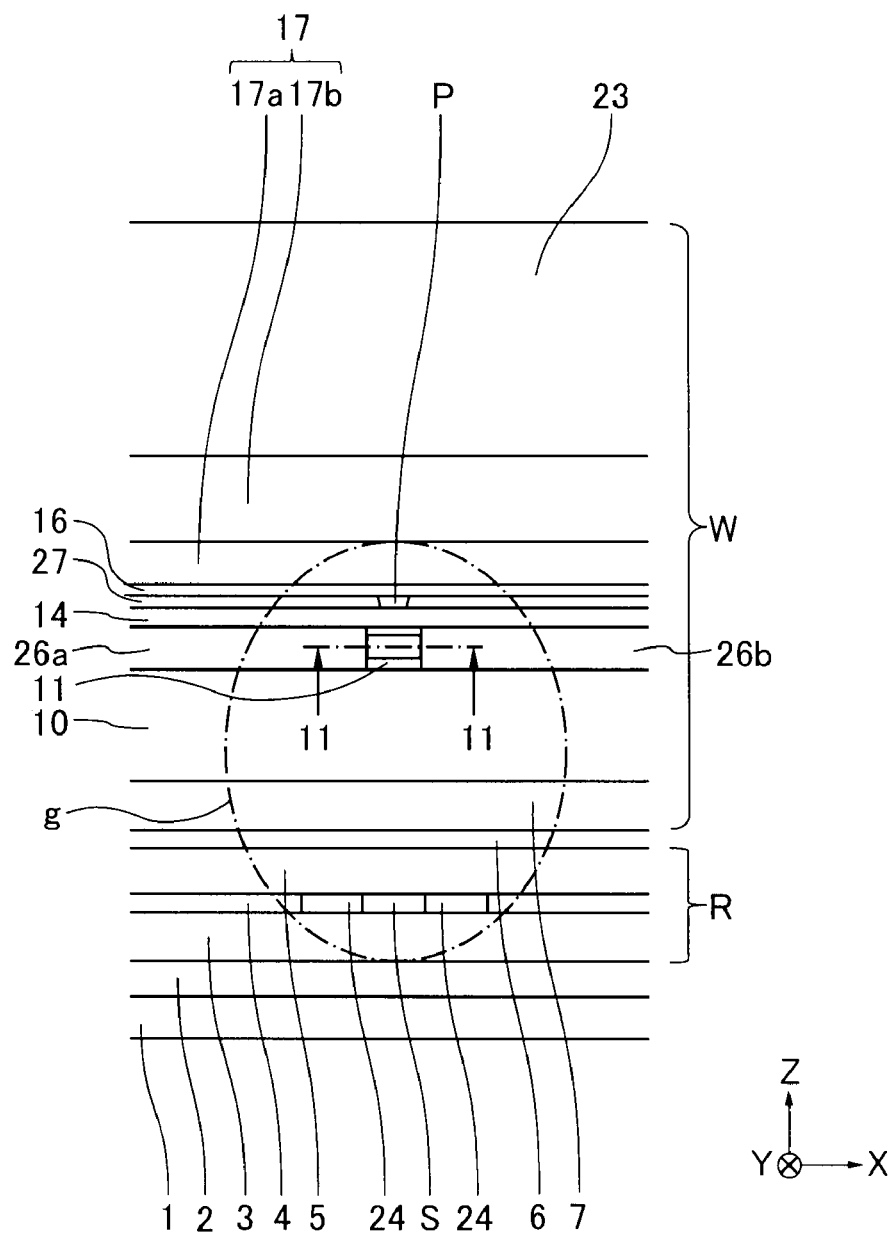
FIG. 4 is a plan view of a magnetic medium-facing surface of the magnetic head.

FIG. 3 shows a partial section taken along line 3-3 in FIG. 2, while FIG. 4 shows the magnetic medium-facing surface A as seen from the front. Referring to these figures, the layer structure of the magnetic head will be schematically described. It should be noted that along the Y axis in the figures, one side close to the magnetic medium-facing surface A and the other side remote therefrom are designated by "front" and "rear", respectively.

It should also be noted that, for the sake of clarity, FIG. 3 additionally shows a magnetic disk M being a magnetic recording medium to be housed within a magnetic recording/reproducing apparatus. The magnetic disk M is formed by stacking a substrate 44, a magnetic layer 43, a protective layer 42, and a lubricating layer 41 in the named order. Here, a flying height FL of the magnetic head refers to a distance between the lubricating layer 41 and the protective film 25 of the magnetic head 25, while a magnetical distance L1 refers to a distance between the magnetic layer 43 and the magnetic medium-facing surface A of the magnetic head.

The magnetic head is formed by stacking, on a substrate 1, an insulating film 2, a reproducing head R using magneto-resistive effect (MR), a separating film 6, a recording head W for performing a recording process in a perpendicular recording system and an overcoat film 23 in the named order.

The reproducing head R is formed by staking a lower read shield film 3, a shield gap film 4, and an upper read shield film 5 in the named order. In the shield gap film 4, a reproducing element S is embedded.

Both the lower read shield film 3 and the upper read shield film 5 function to magnetically separate the reproducing element S from the surroundings and extend rearward from the magnetic medium-facing surface A. The upper read shield film 5 and the lower read shield film 3 are made of a magnetic material such as nickel-iron alloy (NiFe). On the other hand, the shield gap film 4 functions to electrically separate the reproducing element S from the surroundings and is made of a non-magnetic insulating material such as alumina.

The reproducing element S is an element having a giant magneto-resistive effect (GMR) or a tunneling magneto-resistive effect (TMR), and typically, use can be made of a TMR element. As shown in FIG. 4, the reproducing element S has an end face exposed on the magnetic medium-facing surface A, and two bias magnetic field applying films 24 are disposed adjacent to its lateral sides with an insulating film between.

A separating film 6 functions to electrically and magnetically separate the reproducing head R and the recording head W from each other and is internally provided with a heater H. The heater H is a heating resistor which generates heat by power supply from the outside. Thermal expansion due to the heat generation causes bulging of the magnetic medium-facing surface A and also bulging of a surface f1 of the DLC protective film 25 covering it. The symbol f2 indicates the bulged surface of the protective film 25. The heater H is used for both a DLC removing process (St12) that will be described later and a usual information recording and reproducing process.

On the other hand, the recording head W comprises a magnetic film 7, insulating films 8-12, 18-20, coils 21a, 21b, a first gap film 14, a second gap film 16, a main magnetic pole film P, a first non-magnetic film 15, a second non-magnetic film 27, a shield film 17, and a yoke film 22.

The coils 21a, 21b are of a spiral shape and generate a recording magnetic field according to information to be recorded on the magnetic recording medium M. The insulating film 19 is disposed between and around windings of the first coil 21a, while the insulating film 12 is disposed between windings of the second coil 21b and the insulating film 10 is disposed therearound. The insulating film 10 is made of alumina or the like, while the insulating films 12, 19 are made of photoresist or the like. On the trailing side of the second coil 21b, moreover, there is disposed the insulating film 11 made of an insulating material such as alumina.

In the insulating film 11, a resistive element Rs is embedded adjacent to the protective film 25. As shown in FIG. 4, the resistive element Rs is connected at its lateral sides to leads 26a, 26a and functions as a sensor which detects removal of the DLC protective film 25 from the outside at the following DLC removing process (St12).

The main magnetic pole film P is a recording element of a perpendicular magnetic recording system and records information on the magnetic disk M by passing therethrough a magnetic flux of a recording magnetic field generating from the coils 21a, 21b.

The main magnetic pole film P is a multilayer film of a magnetic material extending rearward from the magnetic medium-facing surface A and disposed such that its lateral sides are adjacent to the second non-magnetic film 27, as shown in FIG. 4. The end face of the main magnetic pole film P is exposed on the magnetic medium-facing surface A and has an inverted trapezoid shape, whose upper base and lower base are the longer side directed to the trailing side and the shorter side directed to the leading side, respectively. The upper side of the inverted trapezoid shape is a substantial recording portion of the main magnetic pole film P, and its width defines the recording track width. Typically, the recording track width is approximately 0.2 μm or less.

The first non-magnetic film 15 electrically and magnetically separates the main magnetic pole film P from the surroundings and is made of an inorganic insulating material such as alumina or SiO2 or a metal material such as Ru or Ti.

On the other hand, the second non-magnetic film 27 shown in FIG. 4 is disposed adjacent to the main magnetic pole film P along the X axis direction so as to electrically and magnetically separate the main magnetic pole film P from the surroundings and made of, for example, a non-magnetic insulating material such as alumina.

The first gap film 14 and the second gap film 16 are made of a non-magnetic material and disposed between the insulating film 11 made of alumina or the like and the main magnetic pole film P and between the shied film 17 and the main magnetic pole film P, respectively, with their end faces on the recording medium-facing surface A.

The shield film 17 is made of a magnetic material and functions to circulate a magnetic flux with its end face disposed forward of the end face of the main magnetic pole film P on the recording medium-facing surface A along the moving direction of the recording medium. The shield film 17 has a first layer 17a disposed adjacent to the second gap film 16 and a second layer 17b connected to the first layer 17a on the side opposite from the second gap film 16. The second layer 17b is connected to the yoke film 22 disposed behind the first layer 17a through the insulating film 18 made of an insulating material such as alumina. That is, the shield film 17 is connected to the main magnetic pole film P through the yoke film 22 at a position remote from the recording medium-facing surface A, whereby the main magnetic pole film P, the shield film 17 and the yoke film 22 form a magnetic circuit which circulates a magnetic flux corresponding to a magnetic field generated by the coils 21a, 21b.

The overcoat film 23 is intended to protect the magnetic head and is made of, for example, a non-magnetic insulating material such as alumina.

The magnetic head of the above configuration is then assembled into a head assembly at a head-assembly process (St7). The head assembly includes the above magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (gimbal) and an HAA (head arm assembly) in which the HGA is mounted on an arm.

Figure 5:
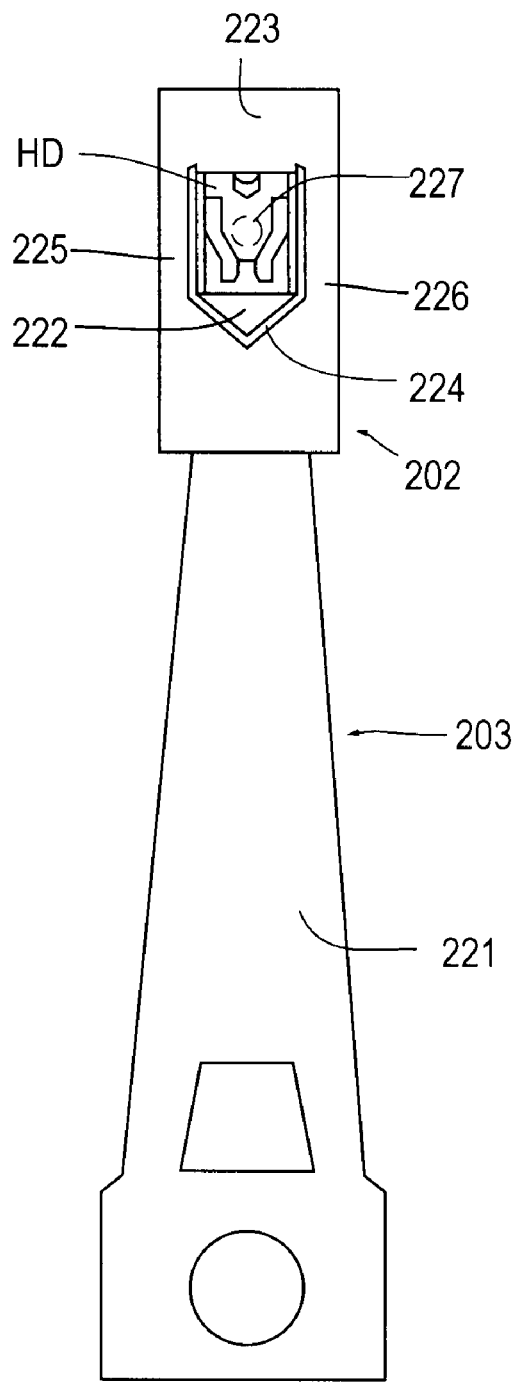
FIG. 5 is a plan view of an HGA.
Figure 6:
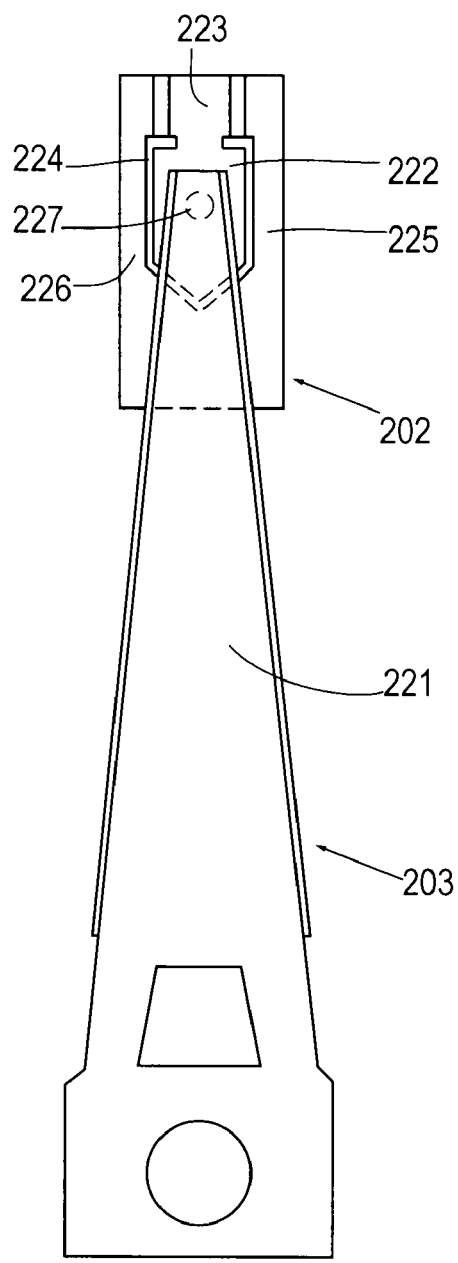
FIG. 6 is a bottom view of the HGA shown in FIG. 5.

FIG. 5 is a front view of the head assembly, and FIG. 6 is a bottom view of the head assembly shown in FIG. 5. The illustrated head assembly is an HGA including a suspension 203 and the above magnetic head HD. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head HD is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head HD is attached to one side of the tongue portion 222 by means of an adhesive or the like, which is kept in spring contact with the tip of the load dimple 227.

One face of the magnetic head 228 opposite from the air bearing surface A of the slider is attached to the tongue portion 222 of the suspension 203. Flexible leads and the like not shown in the drawings are connected to the magnetic head HD.

Figure 7:
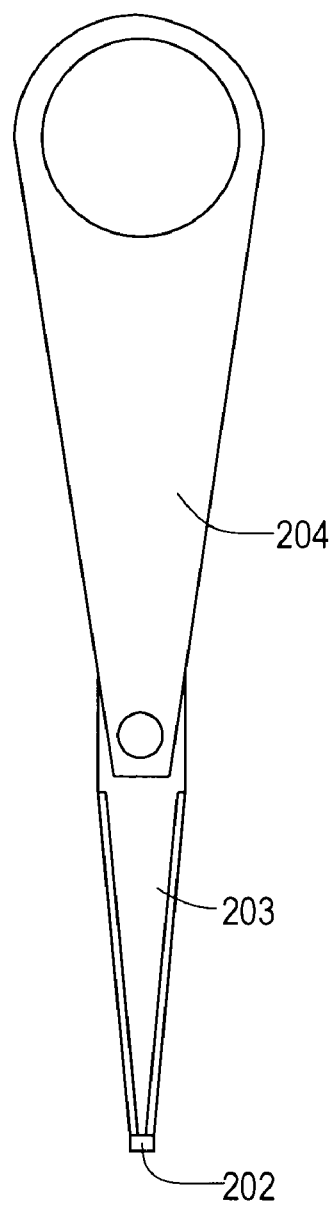
FIG. 7 is a plan view of an HAA.

FIG. 7 is a front view of an HAA. The HAA includes the suspension 203, the magnetic head HD and an arm 204. The arm 204 is integrally formed from a suitable non-magnetic metallic material such as aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

The resulting head assembly is subjected to property test and appearance check at a testing process (St8). After the test, the head assembly is cleaned at a cleaning process (St9) so as to remove a stain which has adhered to a terminal during the test. At this time, since the magnetic medium-facing surface A is covered with the DLC protective film 25, it is sufficiently protected from the corrosive action due to a surfactant.

At an assembling process (St10), subsequently, the head assembly is assembled into an HSA (head stack assembly) where a plurality of HAAs are stacked and then installed within a case of a magnetic recording/reproducing apparatus along with the magnetic disks M and so on.

Figure 8:
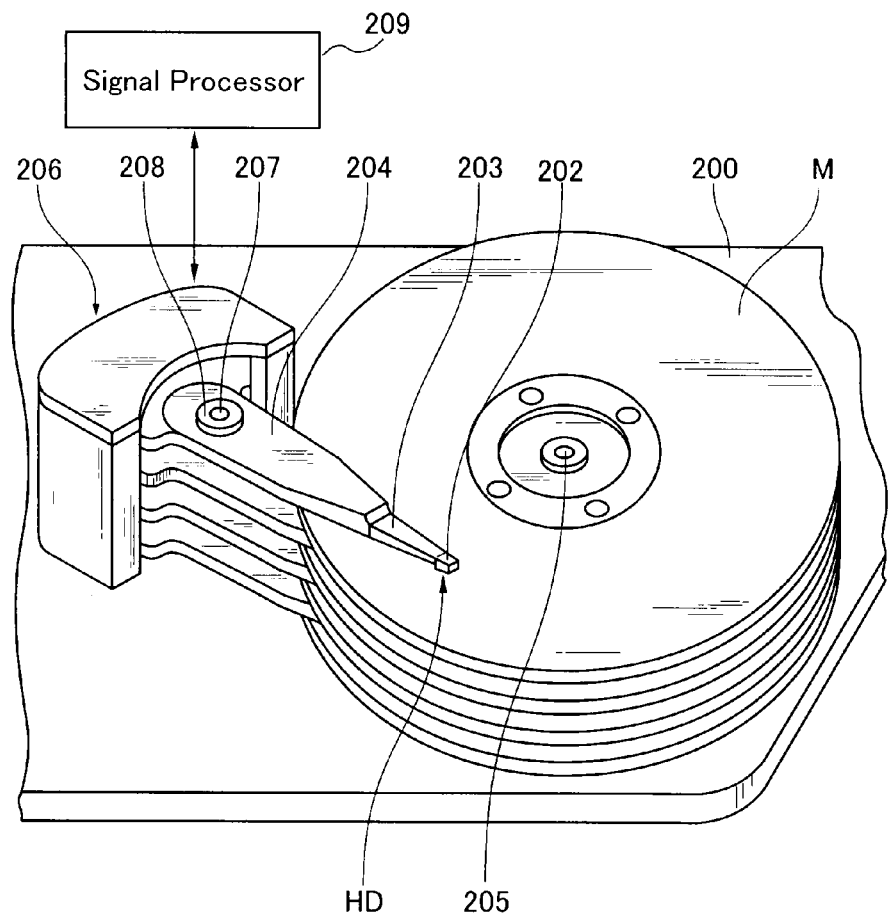
FIG. 8 is a perspective view of an internal structure of a magnetic recording/reproducing apparatus.

FIG. 8 is a perspective view of an internal structure of a magnetic recording/reproducing apparatus. In FIG. 8, a case 200 is partially cut out, making it easy to see the internal structure of the apparatus.

This magnetic recording/reproducing apparatus is equipped with the above head assembly and represented as a hard disk drive in the present embodiment. The magnetic recording/reproducing apparatus includes, within the case 200, a plurality of magnetic disks (i.e., hard disks) M for magnetically recording information, a spindle motor 205 for rotating the magnetic disks M, a plurality of suspensions 203 disposed corresponding to the respective magnetic disks M and supporting the magnetic heads HD at their one ends such that the magnetic disk M is opposed to the magnetic medium-facing surface A, and a plurality of arms 204 supporting the other ends of the suspensions 203. The operation of this mechanism, including recording and reproducing of information, is electrically controlled by a signal processor 209.

When the magnetic disk M rotates for recording or reproducing information, the magnetic head HD takes off from the recording surface of the magnetic disk M utilizing a fluid flow generated between the recording surface (magnetic head-facing surface) of the magnetic disk M and the air bearing surface A.

The magnetic disks M are rotatable about the spindle motor 205 which is fixed to the case 200. The arms 204 are connected to an actuator 206 being a power source and are pivotable through a bearing 208 about a fixed shaft 207 which is fixed to the case 200. The actuator 206 is constructed to include, for example, a driving source such as a voice coil motor.

The case 200 of the magnetic recording/reproducing apparatus thus constructed has a suitable airtight structure based on the known technology such as those described above, and at a next gas injection process (SW), a rare gas such as helium is sealed into it. This reduces the above described windage and windage loss.

The most distinctive feature of the present invention resides in the subsequent DLC removing process (St12). The magnetic head according to the present invention can be obtained through this process.

At the DLC removing process (St12), power is supplied to let the heater H of the magnetic head HD generate heat while rotating the magnetic disk M by the spindle motor 205, wherein thermal expansion due to the heat generation causes bulging of the magnetic medium-facing surface A, bringing the protective film 25 into contact with the magnetic disk M.

Thus, the protective film 25 is pressed against the surface of the rotating magnetic disk M, so that a portion of the protective film 25 covering the reproducing element S and the recording element P can be removed by scraping.

This process can be understood with reference to FIG. 3. Specifically, the surface f1 of the protective film 25 bulges because of the heat generation of the heater H, whereby the bulged surface f2 comes into contact with the surface of the magnetic disk M. Here, if the end face of the reproducing element S bulges as much as the end face of the main magnetic pole P on the magnetic medium-facing surface A, a portion of the protective film 25 covering the end face of the reproducing element S can be scraped off at the same rate as a portion of the protective film 25 covering the end face of the main magnetic pole P, which improves the processing efficiency.

The efficiency of removal of the protective film 25 is also affected by surface roughnesses Ra of the surface of the protective film 25 and the surface of the magnetic disk M. Therefore, optimum surface roughnesses Ra may be obtained by previously processing these surfaces using a known processing means. Regarding the surface of the protective film 25, for example, a given surface roughness Ra may be obtained after the above DLC forming process (St4) by using a known polishing process.

Regarding the magnetic disk M, on the other hand, uniform processing of the entire surface will affect a fluid flow generated by rotation of the disk M when reproducing and recording information, which may also affect flying stability of the magnetic head HD. In addition, since the surface of the magnetic disk M, i.e., the lubricating layer 41, is generally made of a highly-lubricating, low-hardness material, such as perfluoropolyether (PFPE), the efficiency of removal of the protective film 25 is not very high. Therefore, it is desirable to provide a special area where the protective layer 24 formed beneath the lubricating layer 41 is exposed on the surface, adjust its surface roughness Ra, and then apply it to the removal of the protective film 25. Since the protective layer 25 is usually made of the same DLC as the protective film 25 of the magnetic head HD, high removal efficiency can be obtained because of its hardness.

In the case of a Contact Start/Stop-type apparatus, for example, the track where the above area should be formed may be a track adjacent to an inner peripheral portion that is an evacuation area for the magnetic head HD, while in the case of a Load/Unload-type apparatus, it may be an outermost track closest to a ramp portion that is an evacuation area for the magnetic head HD. Hence, after finishing the removal of the protective film 25, the magnetic head HD can be immediately evacuated to the evacuation area without crossing the recording area of the magnetic disk M, so that much shavings resulting from the removal can be prevented from being distributed over the recording area of the magnetic disk M.

Most of the shavings will be blown off from the magnetic disk M by a centrifugal force caused by the rotation of the magnetic disk M, but the shavings are too small to affect the operation of the apparatus. However, it is not preferable that the shavings fall on the recording area of the magnetic disk M because of an external factor such as vibration. Therefore, prior to the DLC forming process (St4), for example, it is desirable that an adhesive material is applied to an inner wall surface of the case 200 so as to trap the blown-off shavings.

Figure 9:
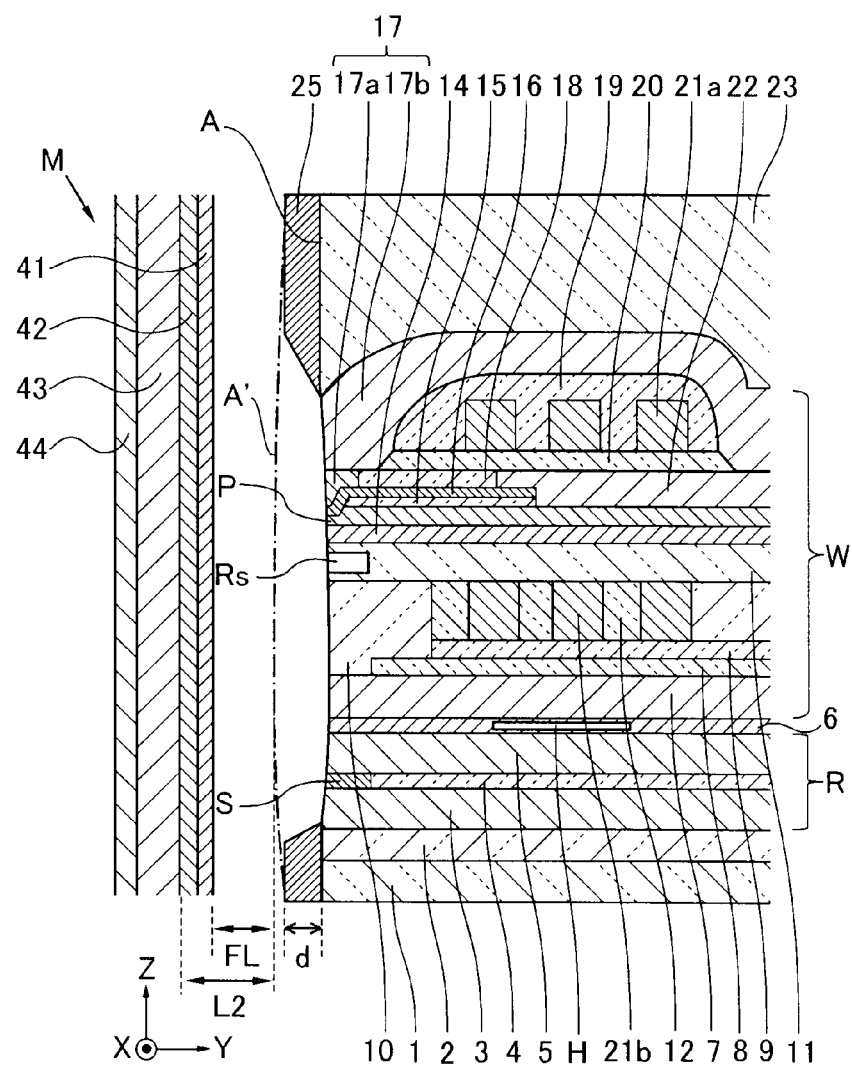
FIG. 9 is a partial sectional view of the magnetic head according to the present invention taken along line 3-3 in FIG. 1.

FIG. 9 shows a sectional view of the magnetic head obtained through the DLC removing process (St12) and corresponds to FIG. 3. It should be noted that the area g surrounded by an alternate long and short dash line in FIG. 4 indicates a portion where the protective film 25 has been removed.

As understood from these figures, the area g is of a generally oval shape and includes the end face of the reproducing element S and the end face of the main magnetic pole P on the magnetic medium-facing surface A. Thus, the end face of the reproducing element S and the end face of the main magnetic pole P can be exposed to the atmosphere within the apparatus. Here, since the inert gas is sealed into the case 200 of the apparatus, the end face of the reproducing element S and the end face of the main magnetic pole P are protected from undesirable chemical reaction. However, it is also possible to remove only a portion of the protective film 25 covering one of the reproducing element S and the main magnetic pole P.

When reproducing and recording information, as shown in FIG. 9, the heater H generates heat to let the magnetic medium-facing surface A bulge to the position of the alternate long and short dash line designated by the symbol A'. Thus, the magnetical distance between the bulged magnetic medium-facing surface A' and the protective layer 42 of the magnetic disk M is reduced by a thickness d of the protective film 25 without substantially changing the flying height FL. That is, the difference between the magnetical distance L1 shown in FIG. 1 and a magnetical distance L2 shown in FIG. 9 is generally equal to the thickness d.

Figure 10:
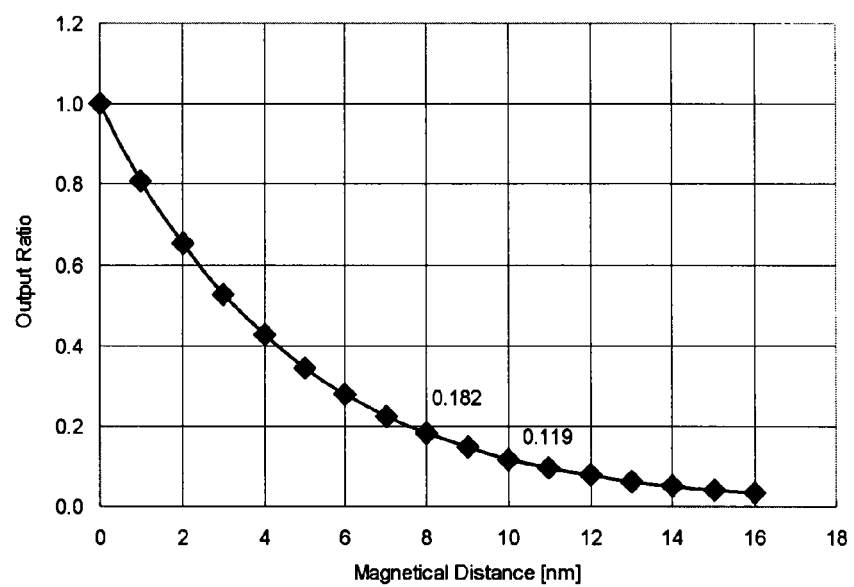
FIG. 10 is a graph showing an output ratio with respect to a magnetical distance.

FIG. 10 is a graph showing a ratio of signal output of the magnetic head to the magnetical distance estimated according to the Wallace's approximation. If the thickness d is 2 (nm) and the magnetical distance L1 is 10 (nm), for example, the magnetical distance L2 after the removal of the protective film 25 is 8(nm), wherein according to the above graph, the output ratio varies from 0.182 to 0.119 and as a result, the increase is expected to be approximately 50(%). Here, it will be easily understood that in the case where the magnetic distance varies from 8 (nm) to 6 (nm), much more improvement can be expected even though the magnetical distance is also reduced by 2 (nm).

After the DLC removing process (St12), the magnetic recording/reproducing apparatus is completed through a testing process (St13). At the testing process (St13), mainly, performance evaluation is conducted for recording and reproducing of information on and from the magnetic disk M, ensuring that the protective film 25 has been properly removed.

However, the removal of the protective film 25 can be detected at the DLC removing process (St12) based on a current flowing through the resistive element Rs or a voltage applied to the resistive element Rs. This method will be described below.

Figure 11:
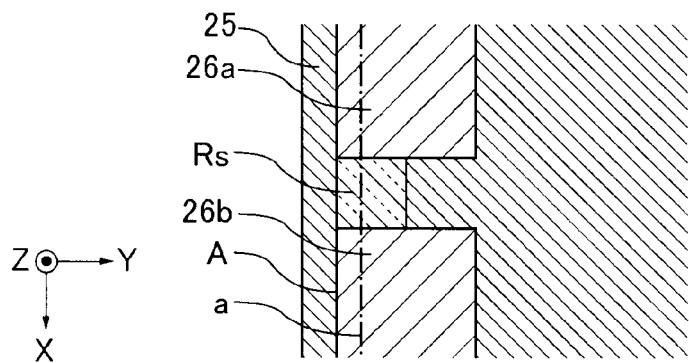
FIG. 11 is a partial sectional view taken along line 11-11 in FIG. 4.

FIG. 11 is a sectional view taken along line 11-11 in FIG. 4. At the lateral sides of the resistive element Rs, the leads 26a, 26b extend along the magnetic medium-facing surface A and are electrically connected to the signal processor 209 within the apparatus through a wiring part including a flexible substrate or the like. The leads 26a, 26b are exposed on the magnetic medium-facing surface A, as shown in FIG. 4, with a larger width than the resistive element Rs so as to reduce the resistance.

Moreover, the alternate long and short dash line designated by the symbol a indicates the magnetic medium-facing surface A after the DLC removing process (St12). At this state, the resistive element Rs is slightly scraped off to have a reduced width in a current direction of the leads 26a, 26b, i.e., in the X axis direction.

Figure 12:
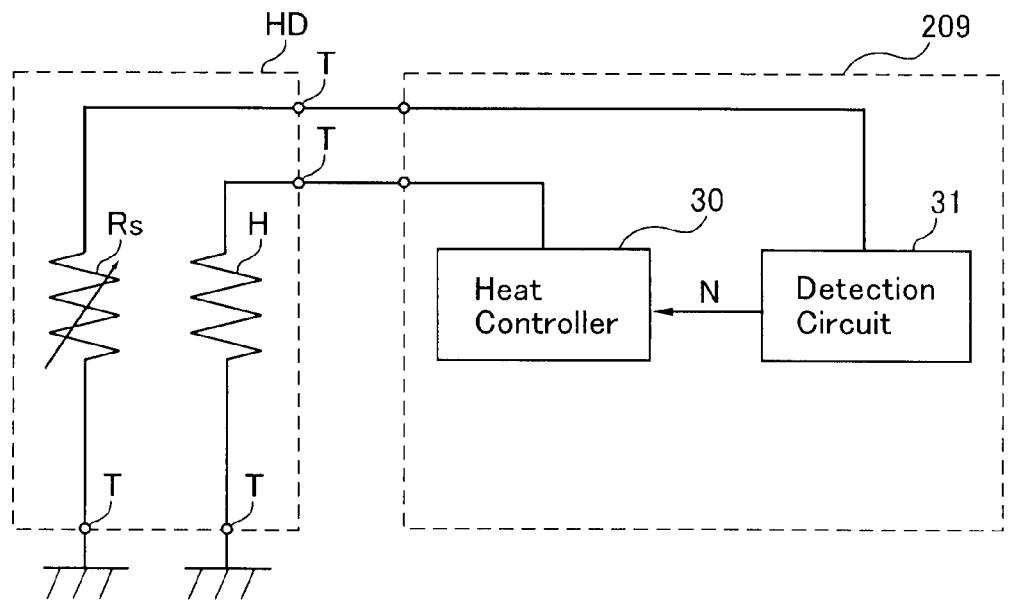
FIG. 12 is an electrical block diagram of a magnetic head and a signal processor.

FIG. 12 shows a schematic electrical configuration of the magnetic head HD and the signal processor 209. The signal processor 209 includes a heat controller 30 and a detection circuit 31, wherein through terminals T disposed at a side face of the magnetic head HD, the resistive element Rs and the heater H are connected to the detection circuit 31 and the heat controller 30, respectively.

The heat controller 30 is a circuit which applies a current to the heater H such the heater H generates a given amount of heat. On the other hand, the detection circuit 31 detects with a comparator that the current flowing through the resistive element Rs or the voltage applied to the resistive element Rs reaches a given value and outputs a notification signal N to the heat controller 30. That is, when the magnetic medium-facing surface A in FIG. 11 recedes to the position of the alternate long and short dash line a at the DLC removing process (St12), the width of the resistive element Rs is reduced as described above to increase the resistance, so that the detection circuit 31 can detect the removal of the protective film 25 based on the resulting current or voltage value of the resistive element Rs.

When receiving the notification signal N, the heat controller 30 stops applying a current to the resistive element Rs. This enables proper scraping of the protective film 25 at the DLC removing process (St12).

However, it is not necessarily required that the heat controller 30 controls the heat generation only for the removal of the protective film 25. The heat controller 30 may also control the heat generation of the heater H for a usual information reproducing and recording process so as to let the magnetic medium-facing surface A bulge to the position indicated by the symbol A' in FIG. 9, whereby a given flying height FL can be given to the magnetic head HD. That is, the heat controller 30 may be constituted to have two different control modes. Switching between these control modes may be performed by a software previously incorporated into the signal processor 209 or an external operation through the signal processor 209.

Figure 13:
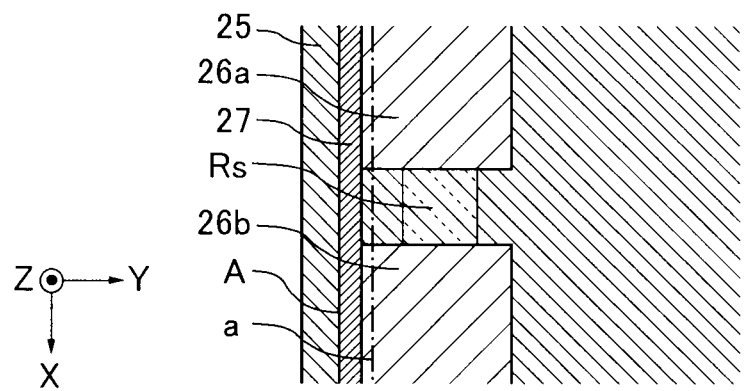
FIG. 13 is a sectional view according to another embodiment, corresponding to FIG. 11.
Figure 14:
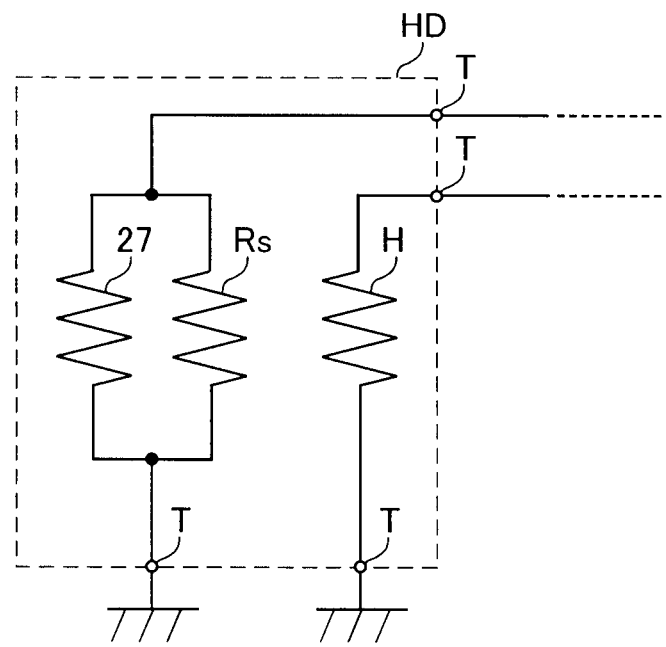
FIG. 14 is an electrical block diagram of a magnetic head according to another embodiment.

FIGS. 13 and 14 show a sectional view corresponding to FIG. 11 and an electrical block diagram corresponding to FIG. 12, respectively, which relate to another embodiment. In this embodiment, a conductive film 27 disposed adjacent to the protective film 25 and extending along the magnetic medium-facing surface A is added to the foregoing embodiment. The conductive film 27 is preferably made of a highly conductive material, for example, one component selected from the group consisting of copper, nickel and permalloy. The conductive film 27 may be formed by a known process such as CVD.

The resistive element Rs is located behind the conductive film 27 as seen from the medium-facing surface A, and the resistive element Rs and the conductive film 27 are spaced apart from each other according to need. Therefore, as shown in FIG. 13, the conductive film 27 and the resistive element Rs are in a parallel-connected relationship with respect to the leads 26a, 26b on their lateral sides.

In this embodiment, when the magnetic medium-facing surface A in FIG. 13 is receded to the alternate long and short dash line a at the DLC removing process (St12), the conductive film 27 is completely removed, allowing the leads 26a, 26b to be short-circuited only through the resistive element Rs. The detection circuit 31 detects the removal of the protective film 25 based on the resulting current or voltage value of the resistive element Rs.

In the former of these two embodiments, since the resistive element Rs itself, which functions as a sensor, is scraped off, high detection sensitivity can be obtained, but since the resistive element Rs is formed along the magnetic medium-facing surface A, the position of the resistive element Rs may vary widely during the formation. In the latter, on the other hand, since the used conductive film 27 has a low resistance, very high detection sensitivity cannot be obtained, but since the resistive element Rs is located behind the conductive film 27, the position does not varies widely. Decision on which embodiment to choose should properly depend on the design.

Figure 15:
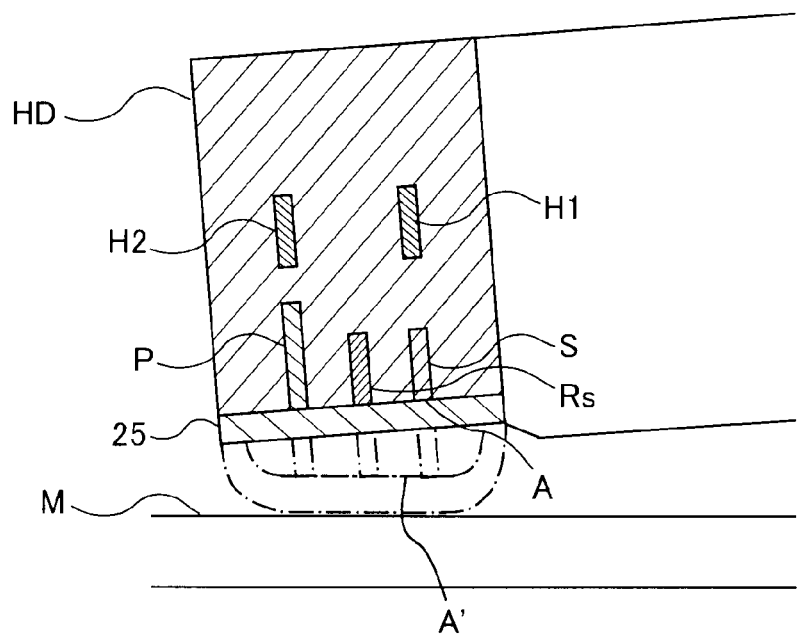
FIG. 15 is a schematic lateral sectional view showing a step of removing a protective film of a magnetic head according to still another embodiment.

Although the magnetic head HD thus far described is provided with a single heater H, the present invention is not limited thereto. FIG. 15 shows an example of use of a magnetic head, in which heaters H1, H2 are provided for the reproducing element S and the main magnetic pole P, respectively.

In this magnetic head HD, the heater H1 is a first heating resistor for bulging an end face of the reproducing element S directed to the medium-facing surface A, while the heater H2 is a second heating resistor for bulging an end face of the main magnetic pole P directed to the medium-facing surface A. The heater H1 is located behind the reproducing element S as seen from the medium-facing surface A, while the heater H2 is located behind the main magnetic pole P as seen from the medium-facing surface A.

The advantage resulting from providing such a dual heater H1, H2 resides in that the degree of bulging can be controlled at the DLC removing process (St12) for each of the reproducing element S and the main magnetic pole P. Since the magnetic head HD within the hard disk device is typically supported such that the magnetic medium-facing surface A is inclined to the surface of the magnetic disk M, there is a slight difference between the magnetical distance of the reproducing element S and the magnetical distance of the main magnetic pole P. Therefore, if the degree of bulging is controlled for each of the reproducing element S and the main magnetic pole P to compensate for the difference, the portion of the protective film 25 covering both the reproducing element S and the main magnetic pole P can be scraped off at an almost uniform ratio.

Specifically, the heat generation amount of the heater H1 and the heat generation amount of the heater H2 may be controlled such that the bulged magnetic medium-facing surface A' is set generally parallel to the surface of the magnetic disk M.

Figure 16:
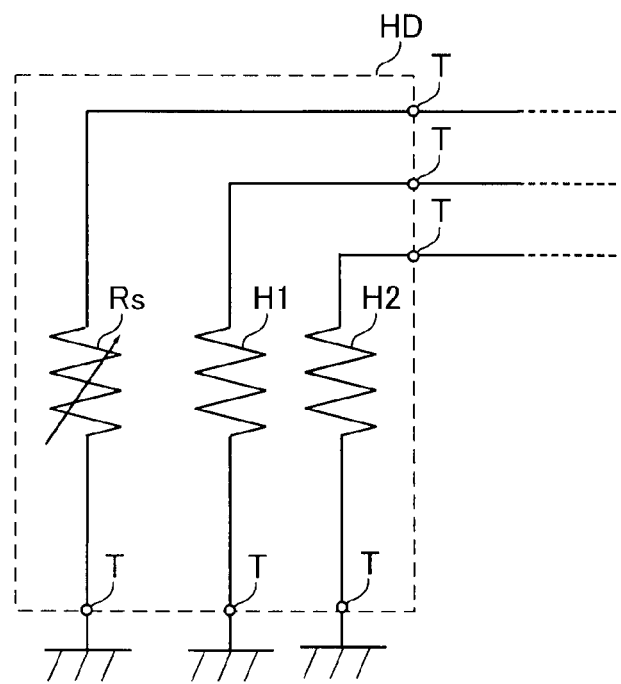
FIG. 16 is an electrical block diagram of a magnetic head according to yet another embodiment.

FIG. 16 shows a schematic electrical configuration of the magnetic head HD including the heaters H1, H2. The heaters H1, H2 are each connected to the above heat controller 30 and supplied with power from the heat controller 30 through each terminal T independently of each other. Then, the heat controller 30 controls the heat generation amount of each of the heaters H1, H2 independently of each other, thereby causing bulging such that the magnetic medium-facing surface A or the surface of the protective film 25 is set generally parallel to the surface of the magnetic disk M.

As has been described above, since the protective film 25 is formed on the magnetic medium-facing surface A at the DLC forming process (St4), the magnetic head according to the present invention will never be corroded at the cleaning processes in the above production process.

Moreover, after the magnetic head according to the present invention is assembled in the magnetic recording/reproducing apparatus at the assembling process (St10), the protective film 25 can be pressed against the surface of the rotating magnetic recording medium M at the DLC removing process (St12), and then the reproducing element S and/or the recording element P can be exposed to the atmosphere within the apparatus.

When the magnetic head according to the present invention performs recording or reproducing of information, accordingly, the reproducing element S and/or the recording element P can be bulged by the heat generation of the heating resistive element H, bringing the reproducing element S and/or the recording element P closer to the magnetic recording medium M by a removed thickness of the protective film 25.

Thus, the magnetic head according to the present invention can achieve performance improvement in recording and/or reproducing of information by reducing the magnetical distance between the magnetic medium-facing surface A and the magnetic recording medium M.

Since the head assembly according to the present invention includes the above magnetic head, it also exhibits the effects thus far described.

In the magnetic recording/reproducing apparatus according to the present invention, moreover, since the inert gas is sealed into the case 200, it is possible to reduce the above windage and windage loss. In addition, since the protective film 25 is formed on the magnetic medium-facing surface A, the magnetic head HD will never be corroded at the cleaning processes in the above production process.

Moreover, the heating resistor H generates heat by power supply, wherein thermal expansion due to the heat generation causes bulging of the magnetic medium-facing surface A, bringing the protective film 25 into contact with the magnetic recording medium M.

In the magnetic recording/reproducing apparatus according to the present invention, therefore, the protective film 25 can be brought into contact with the surface of the magnetic recording medium M, wherein the protective film 25 can be removed by scraping with the magnetic recording medium M being rotated by the motor 205.

Thus, since the reproducing element S and/or the recording element P on the magnetic medium-facing surface A can be exposed to the atmosphere within the apparatus, the magnetic recording/reproducing apparatus according to the present invention can exhibit the same effects as the above magnetic head.

Furthermore, since the magnetic recording/reproducing apparatus equipped with the above magnetic head HD can be obtained according to the magnetic recording/reproducing apparatus manufacturing method according to the present invention, there can be obtained the effects thus far described.

The present invention has been described in detail above with reference to preferred embodiments. However, obviously those skilled in the art could easily devise various modifications of the invention based on the technical concepts underlying the invention and teachings disclosed herein.

What is claimed is:

1. A protective film removal method, comprising:
disposing a magnetic head such that a magnetic medium-facing surface of the magnetic head is opposed to a surface of a magnetic recording medium, the magnetic head including a reproducing element configured to reproduce information recorded on a magnetic recording medium, a recording element configured to record information on the magnetic recording medium, a heating resistor, and a protective film covering the magnetic medium-facing surface, and the reproducing element and the recording element being exposed on the magnetic medium-facing surface;
controlling the heating resistor to generate heat using a power supply while rotating the magnetic recording medium, wherein thermal expansion due to the heat generation causes bulging of the magnetic medium-facing surface such that the protective film is brought into contact with the magnetic recording medium; and
removing a portion of the protective film covering at least one of the reproducing element and the recording element by scraping, wherein the removed portion of the protective film is of an oval shape and includes a region of the protective film covering an end face of the reproducing element and an end face of a main magnetic pole on the magnetic medium-facing surface.

2. The protective film removal method of claim 1, wherein the step of disposing comprises disposing the magnetic head including a resistive element adjacent to the protective film.

3. The protective film removal method of claim 1, wherein the step of disposing comprises disposing the magnetic head including a conductive film adjacent to the protective film and a resistive element located behind the conductive film as seen from the magnetic medium-facing surface.

4. The protective film removal method of claim 3, wherein the conductive film is made of one component selected from the group consisting of copper, nickel and permalloy.

5. The protective film removal method of claim 1, wherein the protective film is made of diamond-like carbon.

6. The protective film removal method of claim 1, wherein the heating resistor includes a first heating resistor configured to bulge the end face of the reproducing element directed to the magnetic medium-facing surface and a second heating resistor configured to bulge an end face of the recording element directed to the magnetic medium-facing surface.

7. The protective film removal method of claim 6, wherein the first and second heating resistors are supplied with power independently of each other.

8. The protective film removal method of claim 7, further comprising:
setting the bulged magnetic medium-facing surface generally parallel to the surface of the magnetic recording medium by controlling a heat generation amount of the first heating resistor and a heat generation amount of the second heating resistor; and
removing a portion of the protective film covering both the reproducing element and recording element by scraping.

9. A magnetic head comprising:
a reproducing element configured to reproduce information recorded on a magnetic recording medium;
a recording element configured to record information on the magnetic recording medium;
a magnetic medium-facing surface on which the reproducing element and the recording element are exposed;
a protective film disposed on the magnetic medium-facing surface; and
a heating resistor configured to generate heat using a power supply while the magnetic recording medium is rotated, wherein thermal expansion due to the heat generation causes bulging of the magnetic medium-facing surface such that the protective film disposed on the magnetic medium-facing surface is brought into contact with the magnetic recording medium, wherein
a portion of the protective film covering at least one of the reproducing element and the recording element is removed by scraping, and
the removed portion of the protective film is of an oval shape and includes a region of the protective film covering an end face of the reproducing element and an end face of a main magnetic pole on the magnetic medium-facing surface.

10. A head assembly comprising the magnetic head of claim 9 and a head support device, wherein
the head support device supports the magnetic head in such a manner as to permit rolling and pitching of the magnetic head.

11. A magnetic recording/reproducing apparatus comprising a head assembly including a magnetic head, a magnetic recording medium, and a motor configured to rotate the magnetic recording medium all disposed within an inert gas-sealed case, wherein the magnetic head includes
- a reproducing element configured to reproduce information recorded on the magnetic recording medium;
- a recording element configured to record information on the magnetic recording medium;
- a magnetic medium-facing surface on which the reproducing element and the recording element are exposed;
- a protective film disposed on the magnetic medium-facing surface; and
- a heating resistor configured to generate heat using a power supply while the magnetic recording medium is rotated, wherein thermal expansion due to the heat generation causes bulging of the magnetic medium-facing surface such that the protective film disposed on the magnetic medium-facing surface is brought into contact with the magnetic recording medium, wherein
- a portion of the protective film covering at least one of the reproducing element and the recording element is removed by scraping, and
- the removed portion of the protective film is of an oval shape and includes a region of the protective film covering an end face of the reproducing element and an end face of a main magnetic pole on the magnetic medium-facing surface.

12. The magnetic recording/reproducing apparatus of claim 11, wherein the magnetic head further includes a resistive element adjacent to the protective film.

13. The magnetic recording/reproducing apparatus of claim 11, wherein the magnetic head further includes a conductive film adjacent to the protective film and a resistive element located behind the conductive film as seen from the medium-facing surface.

14. The magnetic recording/reproducing apparatus of claim 12 or 13, further including a detection circuit electrically connected to the resistive element, wherein the detection circuit is configured to detect removal of the protective film based on a current flowing through the resistive element or a voltage applied to the resistive element.

15. The magnetic recording/reproducing apparatus of claim 13, wherein the conductive film is made of one component selected from the group consisting of copper, nickel and permalloy.

16. The magnetic recording/reproducing apparatus of claim 11, wherein the protective film is made of diamond-like carbon.

17. The magnetic recording/reproducing apparatus of claim 11, further including a heat controller configured to control a heat generation amount of the heating resistor, wherein the heat controller includes a first control mode in which the heat generation amount is controlled so as to bring the protective film into contact with the magnetic recording medium and a second control mode in which the heat generation amount is controlled so as to give the magnetic head a given flying height.

18. The magnetic recording/reproducing apparatus of claim 11, wherein the magnetic head includes, as the heating resistor, a first heating resistor configured to bulge an end face of the reproducing element directed to the medium-facing surface and a second heating resistor configured to bulge an end face of the recording element directed to the medium-facing surface.

19. The magnetic recording/reproducing apparatus of claim 18, further including a heat controller configured to control a heat generation amount of the first heating resistor and a heat generation amount of the second heating resistor independently of each other.

20. The magnetic recording/reproducing apparatus of claim 19, wherein the heat controller is configured to control the heat generation amount of the first heating resistor and the heat generation amount of the second heating resistor in such a manner that the bulged magnetic medium-facing surface is set generally parallel to the surface of the magnetic recording medium.

* * * * *